(No Model.) 3 Sheets—Sheet 1.
J. T. GRAMLING & A. A. ADLER.
POISON DISTRIBUTER FOR PLANTS.
No. 394,264. Patented Dec. 11, 1888.
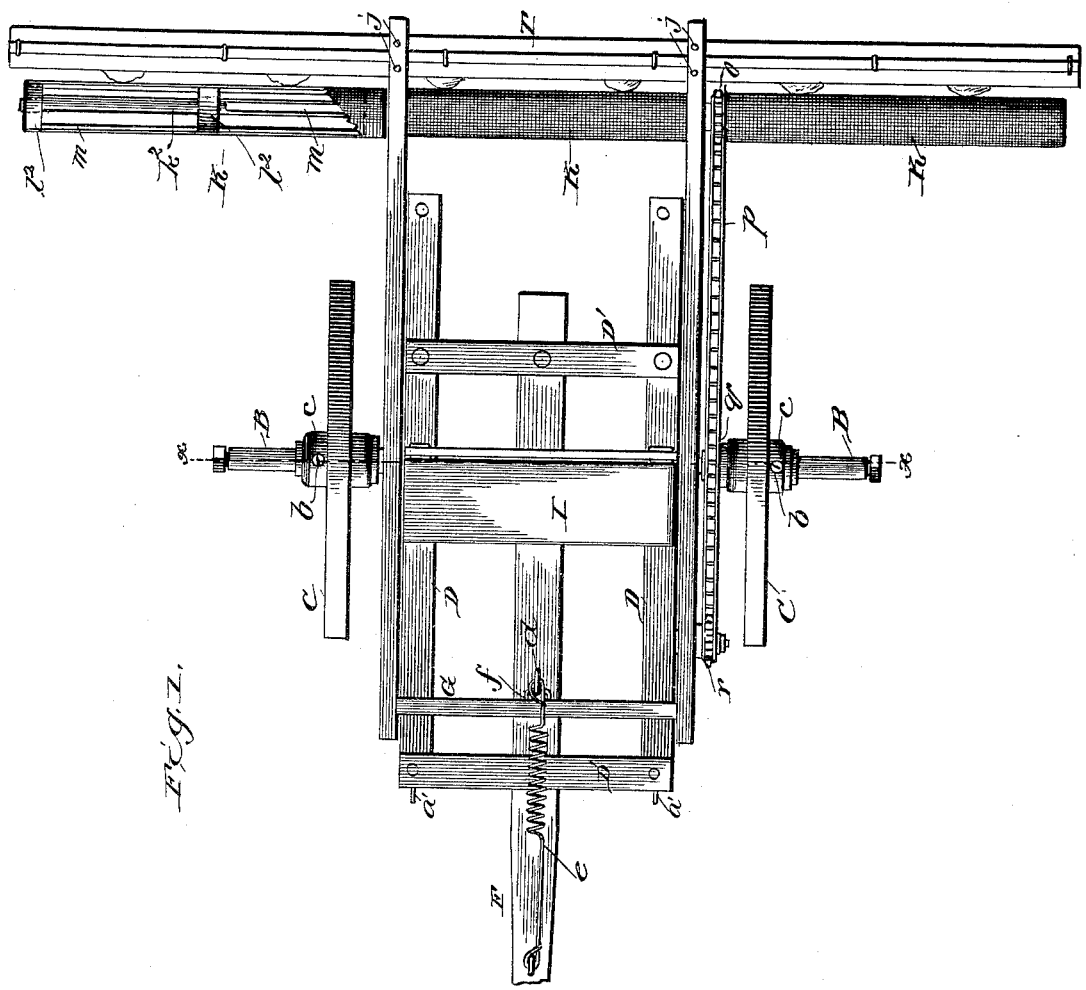
WITNESSES:
Fred G. Dieterich.
Edw. U. Byrn.
INVENTORS
James T. Gramling
Alfred A. Adler
BY
Munn & Co.
ATTORNEYS.

(No Model.) 3 Sheets—Sheet 2.
J. T. GRAMLING & A. A. ADLER.
POISON DISTRIBUTER FOR PLANTS.
No. 394,264. Patented Dec. 11, 1888.
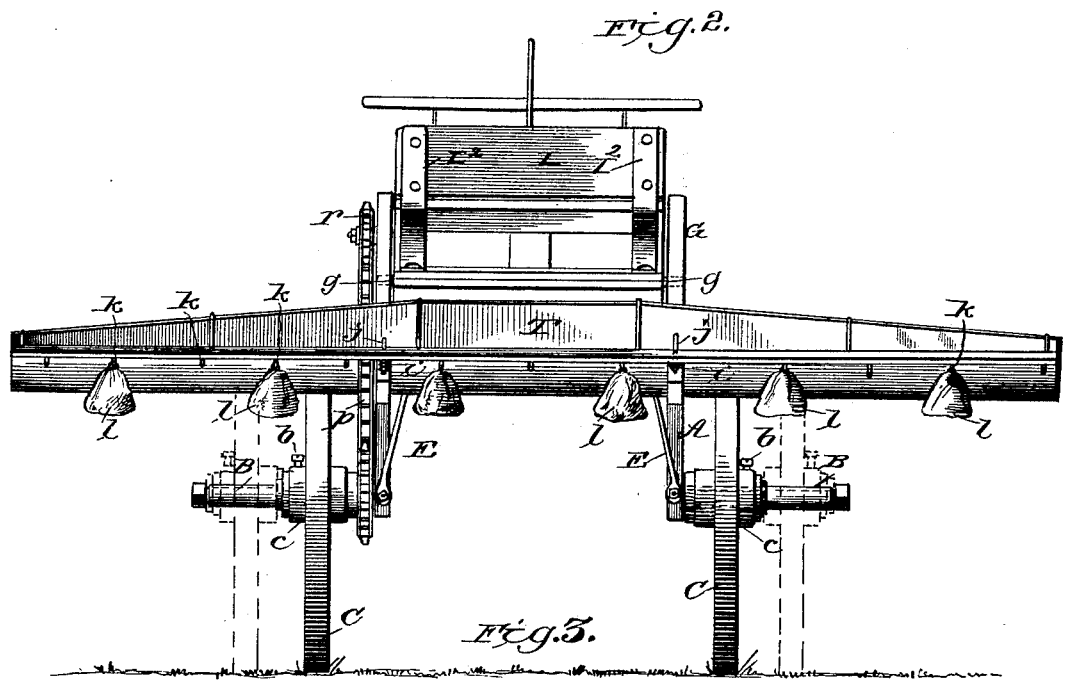
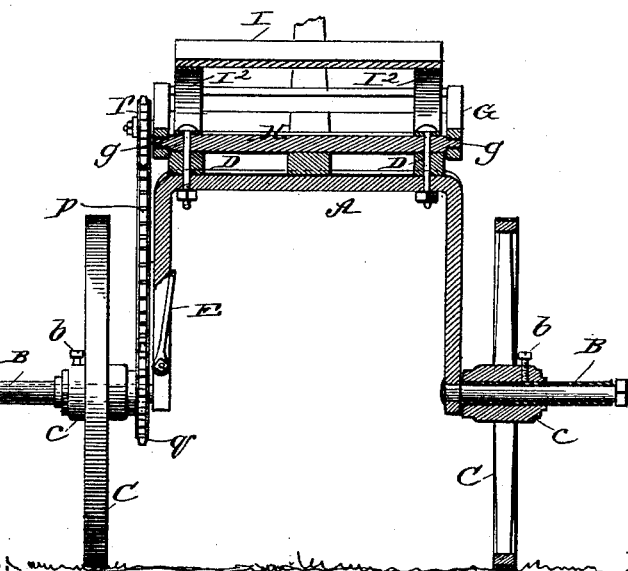
WITNESSES
Fred G. Dieterich.
Edw. W. Byrn.
INVENTORS
James T. Gramling.
Alfred A. Adler
BY Munn & Co.
ATTORNEYS.

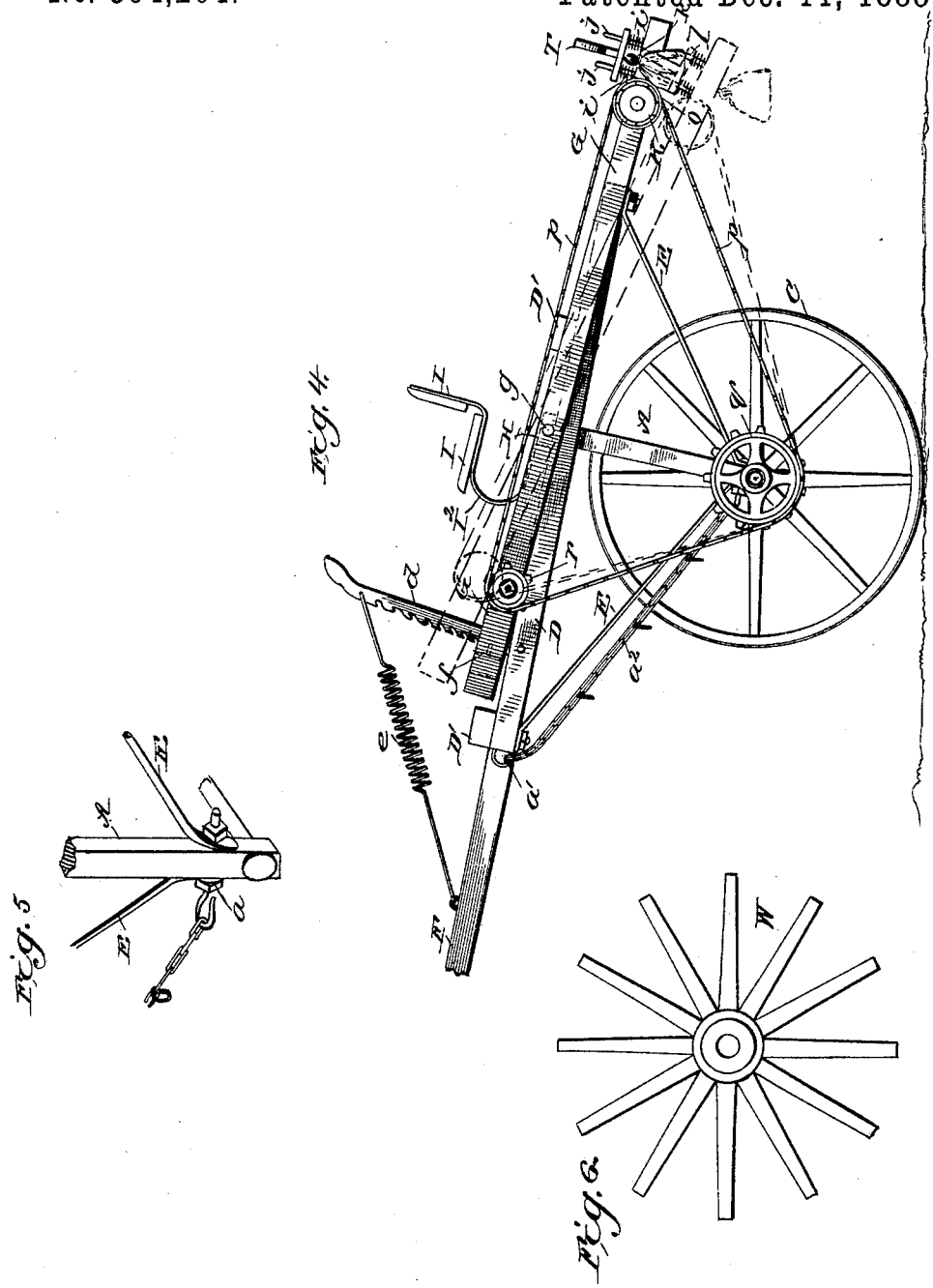

UNITED STATES PATENT OFFICE.

JAMES T. GRAMLING AND ALFRED A. ADLER, OF MAYERSVILLE, MISSISSIPPI.

POISON-DISTRIBUTER FOR PLANTS.

SPECIFICATION forming part of Letters Patent No. 394,264, dated December 11, 1888.

Application filed October 8, 1888. Serial No. 287,559. (No model.)

*To all whom it may concern:*

Be it known that we, JAMES T. GRAMLING and ALFRED A. ADLER, of Mayersville, in the county of Issaquena and State of Mississippi, have invented a new and useful Improvement in Poison-Distributers for Plants, of which the following is a specification.

The object of our invention is to provide an improved device for sifting paris-green or other powdered poison upon growing plants—such as cotton, potatoes, &c.—for the purpose of destroying the insects thereon; and it consists in the peculiar construction and arrangement of parts, which will now be described with reference to the drawings, in which—

Figure 1 is a top plan view. Fig. 2 is a rear end elevation. Fig. 3 is a vertical transverse section through line $x\ x$ of Fig. 1. Fig. 4 is a side elevation with a part of the tongue broken away. Fig. 5 is a detail showing the connection of the brace-bars to the crank-axle, and Fig. 6 is a modification of one of the running-wheels.

A represents the crank-axle, which is bent up in the middle high enough to pass over the tallest branches of cotton. This crank-axle has horizontal arms at its ends, which are about eighteen inches long, which receive long axle-boxes B. Upon these long boxes are adjustably secured the hubs $c$ of the running-wheels C, which are much shorter than the boxes. These hubs $c$ are rigidly connected to the boxes by set-screws $b$, and by this means are made adjustable along the length of the boxes, so as to increase or decrease the space between the wheels to adapt them to rows of different widths, as shown in dotted lines in Fig. 2. To the top of the crank-axle is bolted the horizontal main frame, composed of the longitudinal bars D D and two cross-bars, D' D'. From the opposite ends of each bar D there extends an oblique brace, E, whose lower ends come together near the axle-arm and are connected through the axle by a bolt, $a$, Fig. 5, which has a hook in its forward end. From this hook there extends to a loop or staple, $a'$, in front a chain, $a^2$, or line with loops along it, to which, at various heights, the singletree may be attached, according as mules or horses are used. Bolted to the two cross-bars D' D' is the tongue F, which has a vertical ratchet-bar, $d$, and a spiral spring, $e$, with a hook at its end, which engages with a hole in the ratchet-bar for the purpose of holding its teeth engaged with a loop, $f$, on an adjustable frame, G. This frame is hung upon horizontal pivots or trunnions $g$, formed on the ends of a cross-bar, H, Fig. 3, which is secured by the same bolts that fasten the main frame and axle together. This frame carries the poison-dusting devices at its rear end, and it is adjusted about its pivots or trunnions (see dotted lines, Fig. 4) to raise or lower the poison-dusting devices, as may be required, the ratchet-bar $d$ and loop $f$ serving to fix the adjustment and hold the parts to the desired position. I I' is the seat, which is composed of two boards, I, connected together by two spring-bars, I', which latter are bolted down to the main frame by the same bolt that secures the crank-axle.

At the rear end of the two longitudinal bars of the adjustable frame G is carried, at right angles to the line of draft, the dusting-board T, which may be twenty-four feet long, more or less. This board is sustained loosely upon four spiral springs, $i$, Figs. 2 and 4, which are wound around four stud-bolts, $j$, rising from the adjustable frame. To the under side of this dusting-board is attached a series of hooks, $k$, upon which are hung bags $l$, containing the poison, which bags may be placed directly over the rows of smaller plants, which may be set in narrow rows. The dusting-board, with its series of bags, one over each row, is thus sustained in a sensitively-tremulous position by reason of the spiral springs, which facilitates the sifting of their contents upon the plants.

K is a reel-shaped receptacle for the poison, which may be used in the place of the bags for dusting the poison broadcast. It consists of a shaft, $k^2$, about as long as the dusting-board, (see Fig. 1,) arranged close to it, and having thereon heads $l^2$, with longitudinal slots $m$, covered with cloth or wire-netting, so that as the reel revolves the poison is sifted out upon the plants. This reel also acts as a beater upon the bags of poison and sifts the powder therefrom upon the plants. This reel may be covered by an impervious sleeve when it is not to be used. It is revolved by means of a chain-wheel, $o$, which derives its motion, through chain $p$, from a chain-wheel, $q$, on one of the main supporting-wheels. To prevent this chain from having its tension destroyed by the adjustment of the frame carrying the dusting devices, said chain is extended in front of the main wheel, and is passed around a chain-wheel, $r$, on the adjustable frame, which rises as the rear chain-wheel falls, and thus preserves a uniform tension.

In connection with the device as thus described there is provided a special set of supporting-wheels, W, Fig. 5, which consist of hub and spokes, with no felly or tire. This is designed to be used in the place of the usual wheels where the cotton-plants are blown down or tangled by the wind. When cotton or other plants are in this condition, the wheels with rims do great damage to the plants by running over and mashing and bruising the same. This special form of wheel allows its spokes to pass down through the plants and transport the machine without bruising the plants.

Having thus described our invention, what we claim as new is—

1. The combination, with the elevated crank-axle having supporting-wheels on its horizontal arms, and a chain-wheel on one of the supporting-wheels, of a main frame mounted upon the crank-axle and having a ratchet-bar, $d$, and a spring-hook, $e$, the adjustable frame G, hung upon horizontal pivots or trunnions, and provided with a loop, $f$, engaging the ratchet-bar, and two chain-wheels, $o$ and $r$, the chain $p$, and the poison-dusting devices operated thereby, substantially as shown and described.

2. The combination, with a supporting-frame or running-gear, of a bar arranged at right angles to the line of draft and provided with a series of hooks, and a series of bags for the poison hung upon the hooks, and a revolving agitator or beater arranged to operate upon the bags, substantially as shown and described.

3. The combination, with a supporting-frame or running-gear, of a bar arranged at right angles to the line of draft and provided with hooks, a series of poison-bags hung thereon, and a set of springs supporting the bar in an elastic tremulous condition, as set forth.

4. The combination, with a poison-distributer, of a set of supporting-wheels formed of hubs and spokes, but without circular rim, so as to pass over plants which are tangled or blown down without mashing or bruising the same, as described.

JAMES T. GRAMLING.
ALFRED A. ADLER.

Witnesses:
S. C. ELLIOTT,
JAMES R. SPIERS.